(12) United States Patent
Sugita et al.

(10) Patent No.: US 7,237,664 B2
(45) Date of Patent: Jul. 3, 2007

(54) POWER TRANSMITTING APPARATUS

(75) Inventors: Norihiro Sugita, Shizuoka-ken (JP);
Makoto Kataoka, Shizuoka-ken (JP);
Tomokatsu Kosuga, Shizuoka-ken (JP);
Ryo Egawa, Shizuoka-ken (JP)

(73) Assignee: Kabushiki Kaisha, F.C.C. (JP)

( * ) Notice: Subject to any disclaimer, the term of this patent is extended or adjusted under 35 U.S.C. 154(b) by 143 days.

(21) Appl. No.: 11/062,945

(22) Filed: Feb. 22, 2005

(65) Prior Publication Data

US 2005/0183921 A1    Aug. 25, 2005

(30) Foreign Application Priority Data

Feb. 23, 2004  (JP) .............................. 2004-045616

(51) Int. Cl.
*F16D 13/68* (2006.01)

(52) U.S. Cl. .................................. 192/70.2; 192/107 R

(58) Field of Classification Search ...................... None
See application file for complete search history.

(56) References Cited

U.S. PATENT DOCUMENTS

| 1,172,146 A | * | 2/1916 | Loomis | 192/70.2 |
| 3,094,194 A | | 6/1963 | Kershner | |
| 3,250,349 A | * | 5/1966 | Byrnes et al. | 188/218 R |
| 4,071,360 A | * | 1/1978 | Mannino, Jr. | 72/329 |
| 4,585,105 A | * | 4/1986 | Iio et al. | 228/139 |
| 4,863,001 A | * | 9/1989 | Edmisten | 188/218 XL |
| 5,094,331 A | | 3/1992 | Fujimoto et al. | |

FOREIGN PATENT DOCUMENTS

| FR | 890 310 | | 4/1944 |
| JP | 59086716 A | * | 5/1984 |

* cited by examiner

*Primary Examiner*—Richard M. Lorence
(74) *Attorney, Agent, or Firm*—Harness, Dickey & Pierce, P.L.C.

(57) ABSTRACT

A power transmitting apparatus, which can simultaneously achieve radial size reduction and improve strength of the driving clutch plate, has a clutch housing (2) and a plurality of driving clutch plates (6) each having projections (6*a*) projecting radially outward from the periphery of the driving clutch plate (6). The projections (6*a*) engages the clutch housing (2) to rotate with it. A clutch member (4) has a plurality of driven clutch plates (7) alternately arranged between the driving clutch plates (6). A pressure plate (5) is provided to carry out the pressure-contact or release of the driving clutch plates (6) relative to the driven clutch plates (7). Each of the driving clutch plates (6) has a peripheral surface (β), a projected wall surface (α), of the projections (6*a*), and a connecting surface (γ). Each connecting surface (γ) connects the projected wall surfaces (α) and the peripheral surface (β). Each of the connecting surfaces (γ) is an arcuate surface smoothly merged into the projected wall surface (α) and forms an undercut, recessed radially inward, from the peripheral surface (β) of the driving clutch plate (6).

1 Claim, 4 Drawing Sheets

PRIOR ART

PRIOR ART

POWER TRANSMITTING APPARATUS

CROSS-REFERENCE TO RELATED APPLICATION

This application claims priority to Japanese Patent Application No. 2004-045616, filed Feb. 23, 2004, which application is herein expressly incorporated by reference.

FIELD OF THE INVENTION

The present invention relates to a power transmitting apparatus to arbitrarily transmit or cut off a rotational force of the input member to or from the output member.

BACKGROUND OF THE INVENTION

Ordinarily, a vehicle power transmission apparatus has an input member, connected to an engine and transmission, an output member, selectively connected to selectively driven wheels (e.g. front wheels), and clutch members connected to the output member. The power can be transmitted by pressure-contacting a plurality of driving clutch plates, mounted on the input member, and a plurality of driven clutch plates, mounted on a clutch member, and can be cut off by releasing them.

As shown in FIG. 5, a prior art driving clutch plate 101 used in a power transmitting apparatus has a substantially annular configuration. The clutch plate 101 is formed with a plurality of projections 101a which project radially outward from the periphery of the annular body at an equidistant to each other. The driving clutch plate 101 usually has, as shown in FIG. 6, a linear projected wall surface "a" forming an upstanding surface of the projections 101a. The wall surface "a" is adapted to be engaged by a clutch housing 102. Also, the clutch plate 101 has a peripheral surface "b" on the substantially annular body. A connecting surface "c", having an arcuate configuration of a predetermined curvature, connects the projected wall surface "a" and the peripheral surface "b".

However since the projected wall surface "a" and the peripheral surface "b" are connected by a connecting surface "c", without any undercut, a large clearance "CL" exists between the housing 102 and the peripheral surface "b". This large clearance "CL" is required in order to avoid interference between the housing 102 and the driving clutch plate when the driving clutch plate is assembled onto the clutch housing 102. Accordingly, the substantially linear projected wall surface "a" of the driving clutch plate intimately contacts the clutch housing 102. Thus, the presence of the large clearance "CL" causes an increase in radial size which is a problem in prior art power transmitting apparatus.

On the contrary, it is possible to reduce the clearance "CL" and avoid the interference between the housing and the driving clutch plate, if the radius of curvature of the connecting surface "c" is reduced (i.e. the curvature is enlarged). However the reduction of the radius of curvature of the connecting surface "c" causes stress concentration in the connecting surface "c" and thus a reduction of strength of the driving clutch plate. Accordingly, it is impossible in the prior art power transmission apparatus to simultaneously achieve size reduction and improve the strength of the driving clutch plate.

SUMMARY OF THE INVENTION

It is, therefore, an object of the present invention to provide a power transmitting apparatus which can simultaneously provide radial size reduction and improve the strength of the driving clutch plate.

Accordingly, it is an object of the present invention to provide a power transmitting apparatus comprising a clutch housing rotatable together with an input member. A plurality of driving clutch plates engage the clutch housing to rotate with it. Each driving clutch plate has projections projecting radially outward from the periphery of a body of the driving clutch plate. A clutch member is connected to an output member and has a plurality of driven clutch plates alternating between the driving clutch plates. A pressure plate is mounted on the clutch member. The pressure plate is axially movable to carry out the pressure-contact or release of the driving clutch plates relative to the driven clutch plates, via the axial movement of the driving clutch plates relative to the clutch member. When a rotational force is inputted into the input member, it can be transmitted to or cut off from the output member via the pressure-contact or release between the driving clutch plates and driven clutch plates. Each of the driving clutch plates has a peripheral surface, projected wall surfaces of the projections, and a connecting surfaces. Each connecting surface connects the projected wall surfaces and the peripheral surface. Each connecting surfaces is an arcuate surface smoothly merged into the projected wall surface. Each connecting surface forms an undercut recessed radially inward from the periphery of the driving clutch plate.

According to the power transmitting apparatus of the present invention, an undercut is recessed radially inward from the periphery of the driving clutch plate. Thus, it is possible to simultaneously achieve size reduction in radial direction and improve the strength of the driving clutch plate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims taken in conjunction with the accompanying drawings, wherein:

DETAILED DESCRIPTION OF THE PREFERRED EMBODIMENTS

Preferred embodiment of the present invention will be described with reference to the accompanied drawings.

Figure 1:
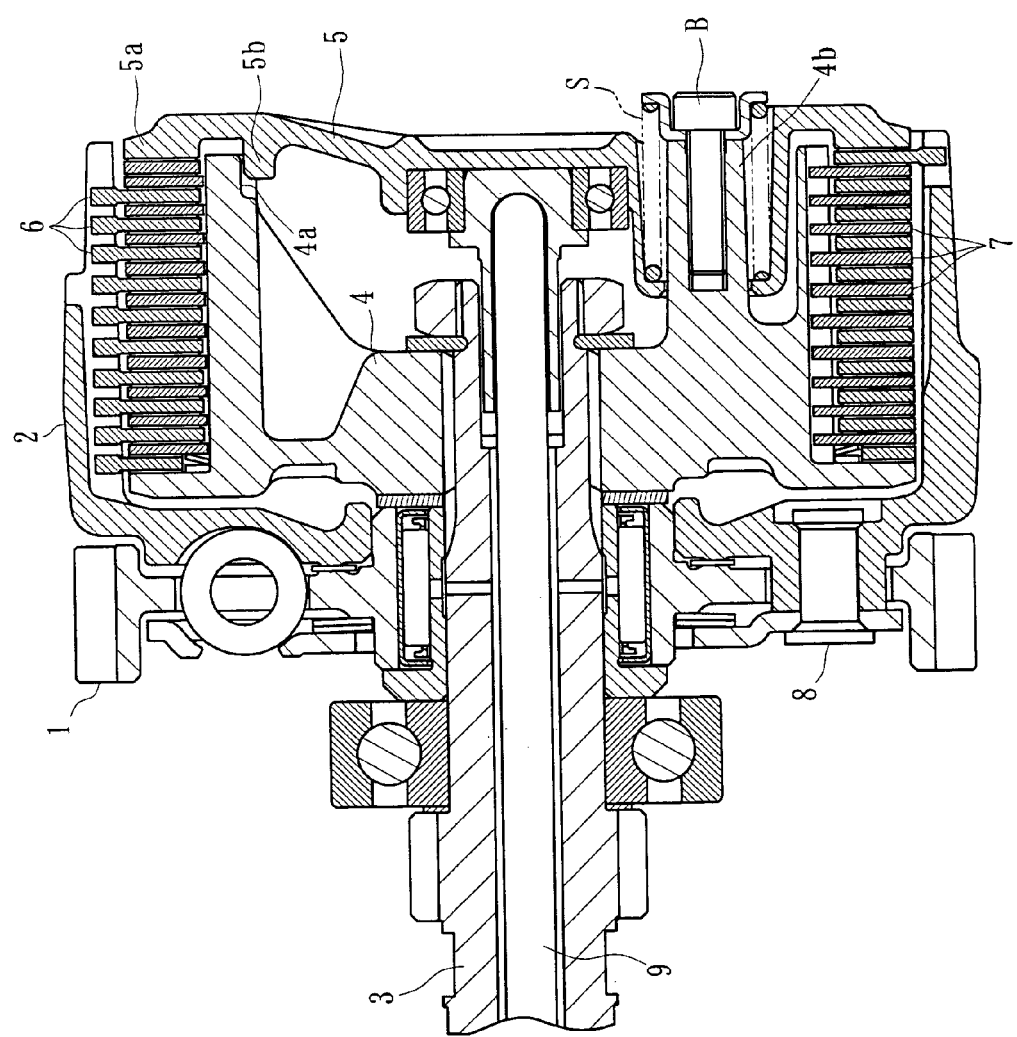
FIG. 1 is a longitudinal section view of a power transmitting apparatus according to the present invention.

A power transmitting apparatus of a first embodiment of the present invention is mounted on a vehicle, such as a four wheel drive vehicle, to arbitrarily transmit or cut off the driving force of an engine and transmission to or from the front wheels of the vehicle. As shown in FIG. 1, the power transmitting apparatus has a clutch housing 2 on which a gear 1, as an input member is mounted. A clutch member 4 is connected to a shaft 3, as an output member. A pressure plate 5 is mounted on the clutch member 4 at the right end (in view of FIG. 1). Driving clutch plates 6 are connected to the clutch housing 2 and driven clutch plates 7 are connected to the clutch member 4.

The gear 1 is rotated around the shaft 3 by a driving force (rotational force) transmitted from the engine and is connected to the clutch housing 2 via rivets 8 etc. The clutch housing 2 is a cylindrical casing member open at the right end. The housing includes a plurality of driving clutch plates 6 on the inner peripheral surface. Each of the driving clutch plates 6 is formed as a substantially annular plate member. Each driving clutch plate engages the clutch housing 2 and rotates together with the housing.

The clutch member 4 is formed as a cylindrical casing member opened at the right end. The clutch member 4 is adapted to be received within the clutch housing 2. The shaft 3 passes through the center of the clutch member 4 and is connected, via a spline connection, and thus is rotated by the clutch member 4. Axially extending splines are formed on the outer peripheral surface of the clutch member 4. The driven clutch plates 7 are fitted on the splines.

The driven clutch plates 7 are alternately arranged with the driving clutch plates 6. Thus, the clutch plates 6 and 7 are adjacent each other to be pressure-contacted or released. That is, both clutch plates 6 and 7 are enabled to be slid axially of the clutch member 4 and pressure-contacted each other when pushed by the pressure plate 5 toward a left direction (in view of FIG. 1). Thus, the rotational force can be transmitted to the clutch member 4 and the shaft 3. On the contrary, when releasing pressure from the pressure plate 5, the plates 6, 7 release each other and the clutch member 4 cannot follow the rotation of the clutch housing 2. Thus, the clutch member 4 is stopped so that power cannot be transmitted to the shaft 3.

In this case, it should be noted that "release" of the clutch plates 6 and 7 means a condition where pressure-contact is lost. Thus, the clutch member 4 does not follow the rotation of the clutch housing 2. Accordingly, a condition exists where the driving clutch plates 6 slide on the driven clutch plates 7. Thus, it is out of the question whether there is any clearance between the clutch plates 6 and 7.

The pressure plate 5 has a substantially disc configuration such as closing the opening the right end of the clutch member 4. The pressure plates is normally urged toward a left direction by the clutch spring S. The urging of the pressure plate 5 is achieved by the clutch spring S. The clutch springs are arranged between a boss portion 4b, projected from the clutch member 4 and extending through the pressure plate 5, and a head of a bolt B screwed in the boss portion 4b.

Thus, the peripheral edge portion 5a of the pressure plate 5 abuts the clutch plate 7 positioned at most right position. The clutch plates 6 and 7 are normally pressure-contacted against each other by the clutch spring S. Accordingly, the clutch housing 2 and the clutch member 4 are kept in a normally connected condition. Thus, the gear 1 can rotate the shaft 3 when rotational force is inputted to the gear 1.

The pressure-contact force between the driving and driven clutch plates 6 and 7 can be released when a driver of the vehicle operates a push rod 9 moving it toward a right direction (in view of FIG. 1). This moves the pressure plate 5 toward or in a right direction against the urging force of the clutch spring S. When the pressure-contacting force between the driving and driven clutch plates 6 and 7 is released, the rotational force inputted to the gear 1 and the clutch housing 2 is cut off and is not transmitted to the shaft 3. Thus, the pressure-contact or the release between the plates 6 and 7 can be achieved by the axial movement of the push rod 9 and the pressure plate 5.

The pressure plate 5 is formed with several projecting stopper portions 5b. The stopper portion 5b limits rotation of the pressure plate 5 relative to the clutch member 4. Each stopper portion 5b has a projected configuration and is fitted in a recess 4a formed on the inner peripheral surface of the clutch member 4. The stopper portion 5b limits the relative rotation between the pressure plate 5 and the clutch member 4.

Figure 2:
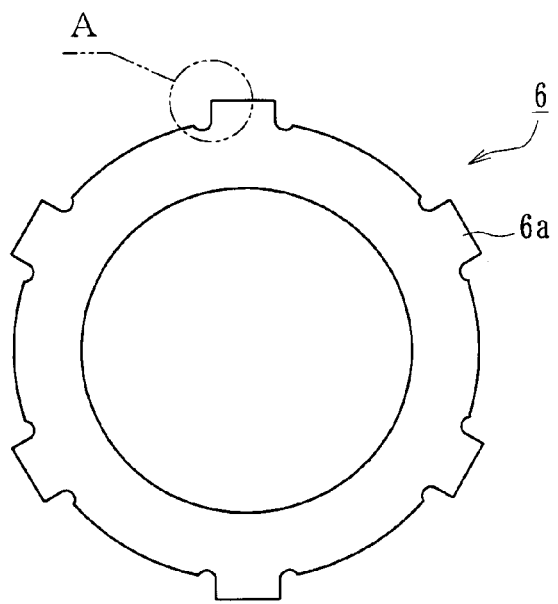
FIG. 2 is a plan view of a driving clutch plate of a first embodiment of the power transmission apparatus of FIG. 1.
Figure 3:
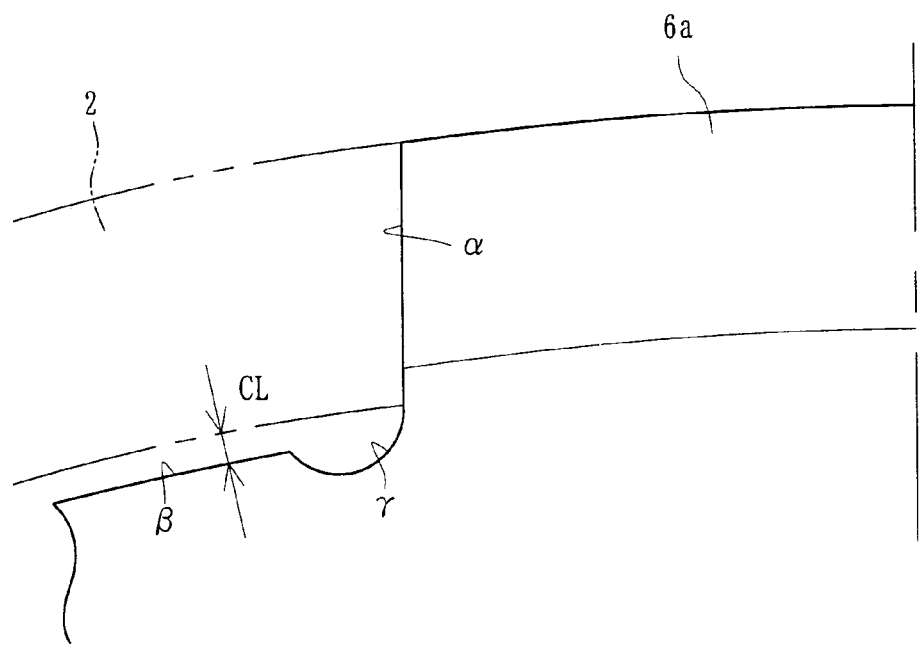
FIG. 3 is an enlarged plan view of a portion encircled by circle A in FIG. 2.

As shown in FIG. 2, the driving clutch plate 6 of the first embodiment is formed with a plurality of projections 6a. The projections 6a project radially outward from the periphery of the driving clutch plate 6 and are adapted to engage with the clutch housing 2 in the rotational direction. As can be seen in more detail in FIG. 3, which is a portion near the projection 6a encircled by a circle "A" in FIG. 2, the encircled portion is formed by a peripheral surface $\beta$ of the body of the driving clutch plate 6. A projecting wall surface $\alpha$ forms an upstanding surface of the projections 6a. A connecting surface $\gamma$ connects the projected wall surface $\alpha$ and peripheral surface $\beta$.

The connecting surface $\gamma$ extends radially inward from the peripheral surface $\beta$ of the driving clutch plate 6 and forms a notch or an undercut at the root of the projection 6a. The notch is recessed radially inward from the peripheral surface $\beta$ of the driving clutch plate 6. In addition, the connecting surface $\gamma$ is an arcuate surface smoothly merged into the projected wall surface $\alpha$. The provision of the connecting surface $\gamma$, with its undercut, makes it possible to reduce clearance CL between the clutch housing 2 and the peripheral surface $\beta$ of the driving clutch plate 6. Also, the connecting surface $\gamma$ makes it possible to reduce the whole size of the power transmitting apparatus, especially the radial dimension.

Furthermore, since the connecting surface $\gamma$ is formed as an undercut surface, it is possible to adopt a smaller curvature, larger radius of curvature, as compared with the prior art connecting surface "c". The connecting surface "c" lacks any undercut, thus having a large curvature, small radius of curvature. Accordingly, the undercut reduces the stress concentration. This improves the strength of the driving clutch plate 6.

Thus, when using the driving clutch plates 6 in a clutch housing of the prior art, it is possible to obtain advantages mentioned above.

Figure 4:
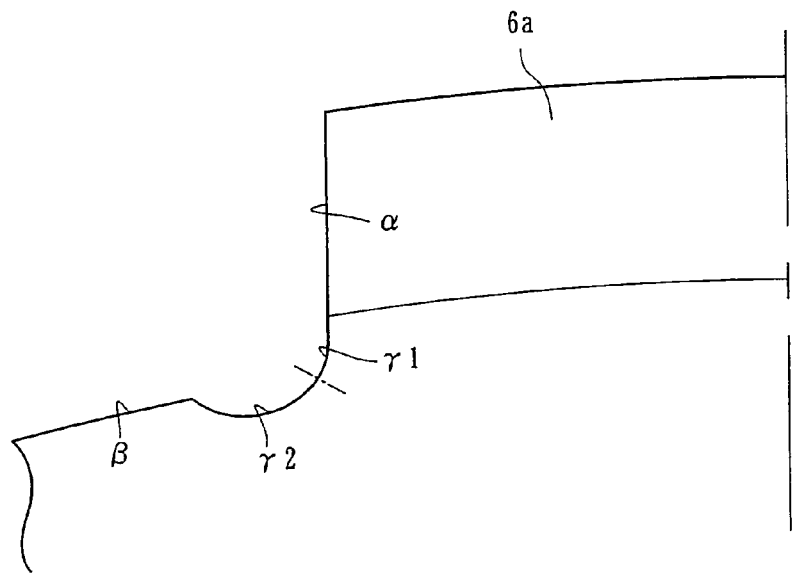
FIG. 4 is an enlarged plan view of a driving clutch plate of a second embodiment of the present invention.
Figure 5:
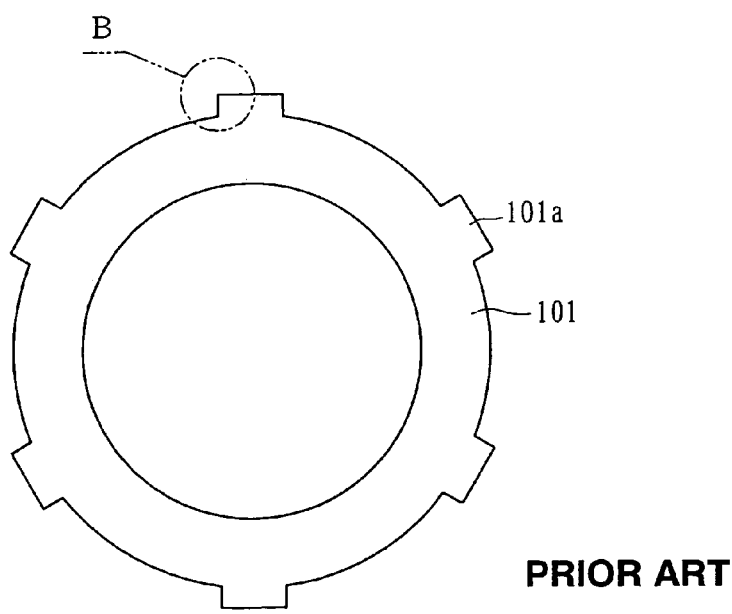
FIG. 5 is a plan view of a prior art driving clutch plate.
Figure 6:
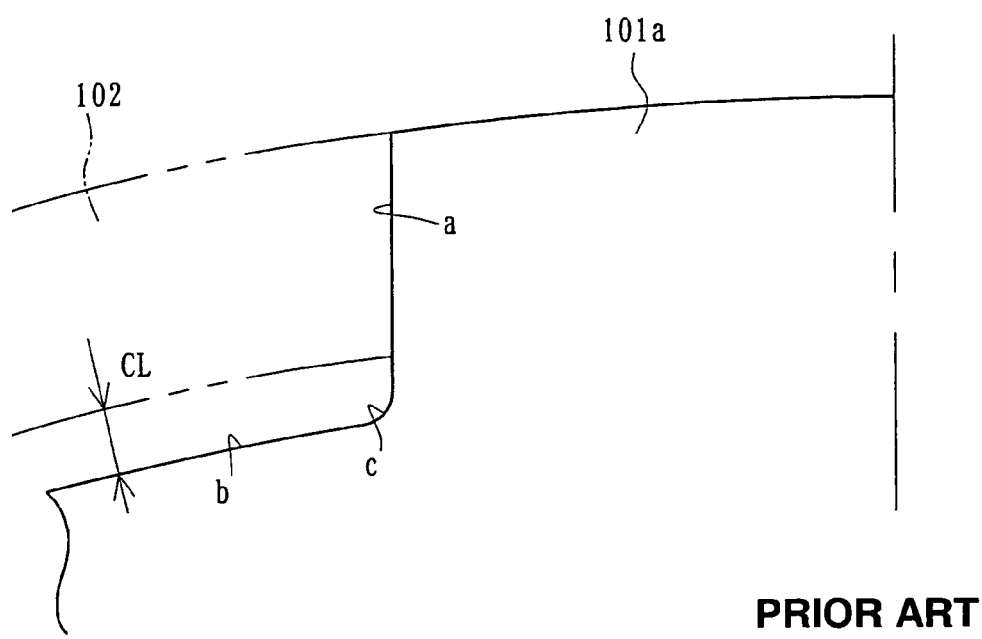
FIG. 6 is an enlarged view of a portion encircled by circle B in FIG. 5.

FIG. 4 shows a second embodiment of the driving clutch plate of the present invention. In this embodiment, the connecting surface comprises a first connecting surface $\gamma 1$ and a second connecting surface $\gamma 2$. The first connecting surface $\gamma 1$ extends from the bottom end of the projected wall surface $\alpha$ and has a predetermined curvature. The second connecting surface $\gamma 2$ extends from the first connecting surface $\gamma 1$ and has a second predetermined curvature which is different from that of the first connecting surface $\gamma 1$. Also in this case, it is necessary that the second connecting surface $\gamma 2$ extends radially inward from the peripheral surface $\beta$ of the driving clutch plate and forms an undercut.

It is preferable that the boundary between the connecting surface γ or first connecting surface γ 1 and the projecting wall surface α is smoothly connected and does not form any angle. If any angle is formed, it is preferable that it is an obtuse angle. When an obtuse angle is formed, it is necessary to extend the position of the boundary on the wall surface α radially inward toward the peripheral surface β in order to reduce the size, in radial direction, of the power transmitting apparatus. The term "smoothly connected" used herein includes not only the case where no angle is formed in the boundary but the case where an obtuse angle is formed when the wall surface α extends radially inward.

The power transmitting apparatus of the present invention can be applied to a power transmitting apparatus of a multiple disc clutch type used on many kinds of vehicles such as a motorcycle, a three or four wheeled buggy, and machines for multiple use.

The power transmitting apparatus of the present invention can be applied to those having other functions or other outline configurations if the power transmitting apparatus is one where the connecting surface is an arcuate surface smoothly connected to the projected wall surface and is formed as an undercut extending radially inward from the periphery of the driving clutch plate.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A power transmitting apparatus comprising:
a clutch housing rotatable together with an input member;
a plurality of driving clutch plates each having projections projecting radially outward from the periphery of the driving clutch plate for engaging the clutch housing to rotate together with the housing;
a clutch member connected to an output member and having a plurality of driven clutch plates alternately arranged between the driving clutch plates;
a pressure plate mounted on the clutch member moveable in an axial direction of the clutch member for carrying out pressure-contact or release of the driving clutch plates relative to the driven clutch plates via the axial movement of the driving clutch plates relative to the clutch member where a rotational force inputted to the input member can be transmitted to or cut off from the output member via the pressure-contact or release between the driving clutch plates and driven clutch plates;
each of the driving clutch plates is substantially planar and defines a plane, said projections being in said plane, each driving plate has a peripheral surface, a pair of projected wall surfaces of the projection, and a pair of connecting surfaces one on each side of said projection, each connecting surface connecting the projected wall surfaces and the peripheral surface, and each of the connecting surfaces is an arcuate surface smoothly merged into the projected wall surface and forms an undercut recessed radially inward from the peripheral surface of the driving clutch plate.

* * * * *